UNITED STATES PATENT OFFICE.

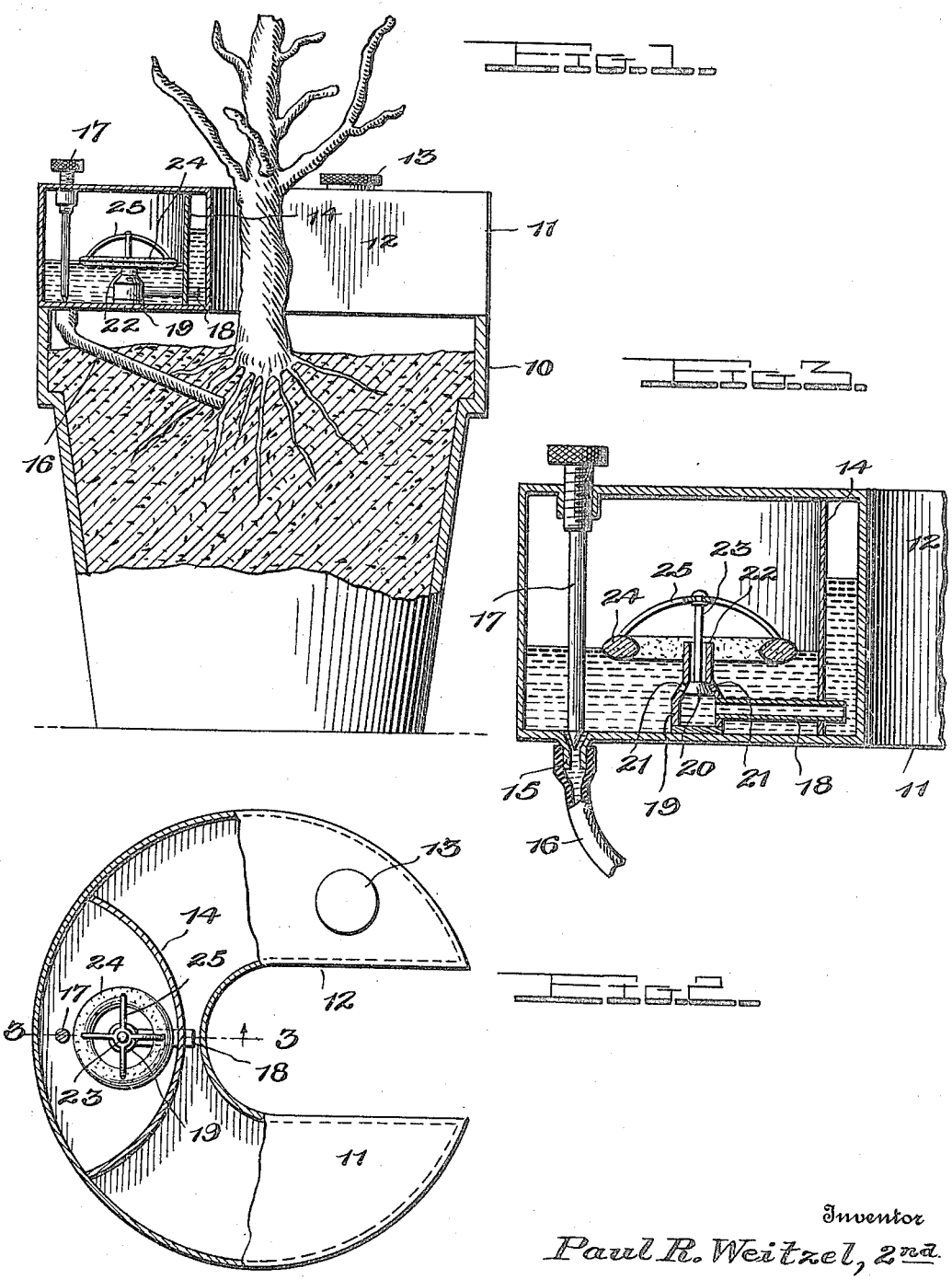

PAUL R. WEITZEL, 2D, OF PHILADELPHIA, PENNSYLVANIA.

REGULATOR FOR FLOWER-POT-WATERING DEVICES.

1,231,976. Specification of Letters Patent. Patented July 3, 1917.

Application filed June 11, 1915. Serial No. 33,491.

*To all whom it may concern:*

Be it known that I, PAUL R. WEITZEL, 2d, a citizen of the United States, residing at Philadelphia, in the county of Philadelphia and State of Pennsylvania, have invented new and useful Improvements in Regulators for Flower-Pot-Watering Devices, of which the following is a specification.

This invention relates to watering devices for flower pots and has particular reference to an improved means for regulating the drip or flow of water from the device to the flower pot.

In prior devices of this nature, provision has been made only to admit of the dropping or flowing of the water from the device to the roots of the plant in the flower pot. The disadvantage found with these constructions has been that when the device is filled to its capacity, the pressure of the water in the device necessitates the adjusting of the valve into a nearly closed position, while as the water passes out of the device and the pressure is reduced the flow of the water is considerably reduced and frequently to such an extent as to be impracticable. Furthermore, if the valve is adjusted to take care of the flow of water when the pressure is reduced, the result will be the flooding of the flower pot as the roots and earth cannot absorb the water proportionately to the feeding of the same.

To overcome these disadvantages the present invention contemplates a construction of water-feeding device wherein the flow of water is regulated to drip at a constant rate at all times, and to thus admit of the regulation of the valve to feed water to the flower pot at a rate proportionate to the absorption of the water to thus prevent a flooding of the flower pot.

While the objects of this invention may be accomplished by various structures, the following description sets forth the preferred embodiment of the invention, and in this detail description will appear other objects and advantages more or less important.

In the accompanying drawing is disclosed this preferred embodiment of the invention, wherein,—

Figure 1 is a vertical section taken through a watering device applied to a flower pot and having the improvements therein.

Fig. 2 is a top plan view of the device detached from the flower pot, parts of the same being shown in section.

Fig. 3 is a vertical section enlarged through a portion of the watering device showing the improved regulator of this invention.

Referring to this drawing, 10 designates a flower pot of any approved form and upon which is placed a water-feeding device 11. For the purpose of illustration, this water-feeding device is shown as comprising a container of disk form having a radial opening 12 in one side thereof admitting of the slipping of the container over the top of the flower pot about the trunk or stem of the plant. The container is provided with a movable cap 13 admitting of the filling of the container with water or the like to be fed to the plant.

At one side of the container 11, and preferably diametrically opposite the slot or radial opening 12, there is placed a partition 14 forming an inclosed chamber separated from the interior of the container 11. It will be seen that by locating this inclosed chamber diametrically opposite the radial opening 12 a balanced and symmetrical arrangement is provided and the small feed chamber is advantageously placed for economy of space. The bottom of the container 11, as shown to advantage in Fig. 3, is provided with a nipple 15 leading from the inclosed chamber and adapted to receive the upper end of a flexible tube 16 which is embedded in the earth and discharges at the root of the plant. The nipple 15 is in the form of a valve seat adapted to receive a needle valve 17, the latter being preferably screw-threaded through the top of the container and extending vertically down into the top of the nipple 15. The needle valve 17 may thus be regulated by turning the same with the fingers to admit of the seepage or trickling of the water from the inclosed chamber into the tube 16. The partition 14 is provided at a suitable point with an outlet shown in the present instance as in the form of a tube 18 projecting into the inclosed chamber and terminating in a housing 19, in which is incased a vertically movable valve 20. The upper part of the housing is formed into a valve seat having outlet openings 21 therein adapted to be closed by the valve 20 when raised. Above the outlet openings 21, the housing 19 terminates in a guide 22 adapted to receive a vertically movable valve stem 23 supporting a float 24. As shown, the float 24 is in the form of an annulus of cork or other water nonabsorbent material which is buoyant, and which is connected by a spider 25 to the upper end of the valve 23.

In operation, the container 11 is filled with water and the water passes through the tube 18, housing 19, out through the openings 21 into the inclosed chamber. As the water rises in the inclosed chamber, the float 24 is raised and, through the connecting spider 25 raises the valve stem 23 and valve 20 until the desired height of water is attained in the inclosed chamber. The water now passes from the inclosed chamber into the tube 16, and the outflow of the water is regulated by turning the needle valve 17. As soon as the water flows out of the inclosed chamber to reduce the pressure of the water passing out of the nipple 15 and the float 24 drops below its normal position, the valve 20 is opened and the water in the body of the container passes into the inclosed chamber. It is thus seen that a constant level of water is had in the inclosed chamber, and that consequently a constant pressure of water is had passing down through the nipple 15. By providing a container of the disk-like form shown and having a plant-receiving slot, the device may be so positioned on the pot as to give a symmetrical appearance to the same; and, furthermore, there are no parts projecting horizontally beyond the circumference of the pot to interfere with close nesting or assembling of the pots, and no parts projecting upwardly to obscure or interfere with the plant. Again, by reason of the construction shown, a stable device is secured, which will rest firmly and without the necessity of fastening devices upon the top of the pot. It will be seen also that as the tank covers substantially the entire top of the pot or receptacle, evaporation will be less rapid than if the top of the soil were completely exposed, although aeration of the soil and plant roots is sufficiently taken care of through the receiving slot or radial opening 12.

As above noted, this invention may be embodied in various structures and the above is but one example set forth for the purposes of illustrating the present invention. Various changes and modifications are therefore contemplated within the scope of the following claim.

It will also be noted that although this invention is shown and described as applied to a flower pot watering attachment, that invention resides chiefly in the improved means for regulating the flow of fluid, and that the invention may be applied to various devices where such action is required.

What I claim as new is,—

A device for watering flower pots, comprising a circular closed tank provided with a filling opening in its top and adapted to rest upon the upper edge of a flower pot and having a radially disposed slot extending outwardly to its circumference to receive and embrace the stalk of a plant, a wall within said tank opposite said slot to divide the tank into a large supply chamber and a small feed chamber, a valve connection between said supply and feed chambers controlled by liquid within said feed chamber, and an adjustable valved discharge outlet from said small chamber through the bottom of said tank.

In testimony whereof I have hereunto set my hand in presence of two subscribing witnesses.

PAUL R. WEITZEL, 2.

Witnesses:
J. P. BARBER,
JEAN R. NEWLIN.

Copies of this patent may be obtained for five cents each, by addressing the "Commissioner of Patents, Washington, D. C."